US012683378B2

(12) United States Patent
Takahashi

(10) Patent No.: US 12,683,378 B2
(45) Date of Patent: Jul. 14, 2026

(54) SWITCH DEVICE, ELECTRONIC DEVICE AND VEHICLE

(71) Applicant: ROHM CO., LTD., Kyoto (JP)

(72) Inventor: Naoki Takahashi, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 19/095,218

(22) Filed: Mar. 31, 2025

(65) Prior Publication Data

US 2025/0233404 A1    Jul. 17, 2025

Related U.S. Application Data

(63) Continuation of application No. PCT/JP2023/029699, filed on Aug. 17, 2023.

(30) Foreign Application Priority Data

Oct. 6, 2022    (JP) ................................ 2022-161362

(51) Int. Cl.
*H02H 3/08* (2006.01)
*B60R 16/03* (2006.01)
(52) U.S. Cl.
CPC .............. *H02H 3/08* (2013.01); *B60R 16/03* (2013.01)
(58) Field of Classification Search
CPC ............ H02H 3/08; H02H 3/087; H02H 5/04; H02H 7/20; H02H 9/02; B60R 16/03; H03K 17/00
See application file for complete search history.

(56) References Cited

U.S. PATENT DOCUMENTS 5,914,586 A * 6/1999 Fujita ..................... G05F 3/222
320/136
10,790,657 B2 9/2020 Takuma et al.
(Continued)

FOREIGN PATENT DOCUMENTS

WO        2017187785 A1    11/2017

OTHER PUBLICATIONS

International Search Report for International Application No. PCT/JP2023/029699; mailed Oct. 24, 2023.
(Continued)

*Primary Examiner* — Menatoallah Youssef
*Assistant Examiner* — Michael J Warmflash
(74) *Attorney, Agent, or Firm* — CANTOR COLBURN LLP

(57) ABSTRACT

A switch device includes: a power supply terminal; an output terminal; a switch element configured to be connected between the above terminals; a signal output terminal configured to output an output current detection signal corresponding to an output current that flows during the on period of the switch element; an overcurrent protection circuit configured to restrict the output current detection signal to an overcurrent restriction value or less during the on period of the switch element; and an output abnormality detection circuit configured to monitor, while switching between a first state where no current is supplied to the output terminal and a second state where a current is supplied to the output terminal during the off period of the switch element, the output voltage of the output terminal in each of the first and second states, and to switch the logic level of the output current detection signal.

10 Claims, 6 Drawing Sheets

(56) References Cited

U.S. PATENT DOCUMENTS

| 11,183,829 | B2 | 11/2021 | Takuma et al. | |
| 11,637,420 | B2 | 4/2023 | Takuma et al. | |
| 11,843,235 | B2 | 12/2023 | Takuma et al. | |
| 12,184,054 | B2 | 12/2024 | Takuma et al. | |
| 2009/0316320 | A1* | 12/2009 | Maeda | B60R 16/03 |
| | | | | 361/92 |
| 2017/0001582 | A1* | 1/2017 | Choo | B60K 35/80 |
| 2018/0358898 | A1* | 12/2018 | Yamaguchi | G05F 1/461 |
| 2019/0123541 | A1* | 4/2019 | Takuma | B60R 16/03 |
| 2020/0403393 | A1 | 12/2020 | Takuma et al. | |
| 2022/0037872 | A1 | 2/2022 | Takuma et al. | |
| 2022/0393593 | A1* | 12/2022 | Fukushima | H02M 1/08 |
| 2023/0216289 | A1 | 7/2023 | Takuma et al. | |
| 2024/0039268 | A1 | 2/2024 | Takuma et al. | |

OTHER PUBLICATIONS

PCT Written Opinion of the International Searching Authority for International Application No. PCT/JP2023/029699; mailed Oct. 24, 2023.

* cited by examiner

| OUT | IN | SEN | Vs | Judgement |
|-----|-----|-----|-----|-----|
| Normal | L | x | L | OFF |
|        | H | x | Is × Rs | Current Sense |
| Open Load | L | L | L | Open Load |
|           | L | H | H |  |
|           | H | x | L | Open Load or VBB Short |
| VBB Short | L | x | H | VBB Short |
|           | H | x | L | Open Load or VBB Short |
| GND Short | L | x | L | OFF |
|           | H | x | H(Vocp) | GND Short or Over Current |

X

SWITCH DEVICE, ELECTRONIC DEVICE AND VEHICLE

CROSS REFERENCE TO RELATED APPLICATIONS

This application is a continuation under 35 U.S.C. § 120 of PCT/JP2023/029699, filed Aug. 17, 2023, which is incorporated herein by reference, and which claimed priority to Japanese Application No. 2022-161362, filed Oct. 6, 2022. The present application likewise claims priority under 35 U.S.C. § 119 to Japanese Application No. 2022-161362, filed Oct. 6, 2022, the entire content of which is also incorporated herein by reference.

TECHNICAL FIELD

An invention disclosed in the present specification relates to a switch device and an electronic device and a vehicle which use the switch device.

BACKGROUND ART

The present applicant has previously proposed a large number of new techniques for switch devices such as an in-vehicle IPD [intelligent power device] (see, for example, Patent Document 1).

RELATED ART DOCUMENT

Patent Document

Patent Document 1: International Publication No. 2017/187785

BRIEF DESCRIPTION OF DRAWINGS

FIG. 3 is a diagram showing an example of an output abnormality detection operation;

DESCRIPTION OF EMBODIMENTS

<Semiconductor Integrated Circuit Device>

Figure 1:
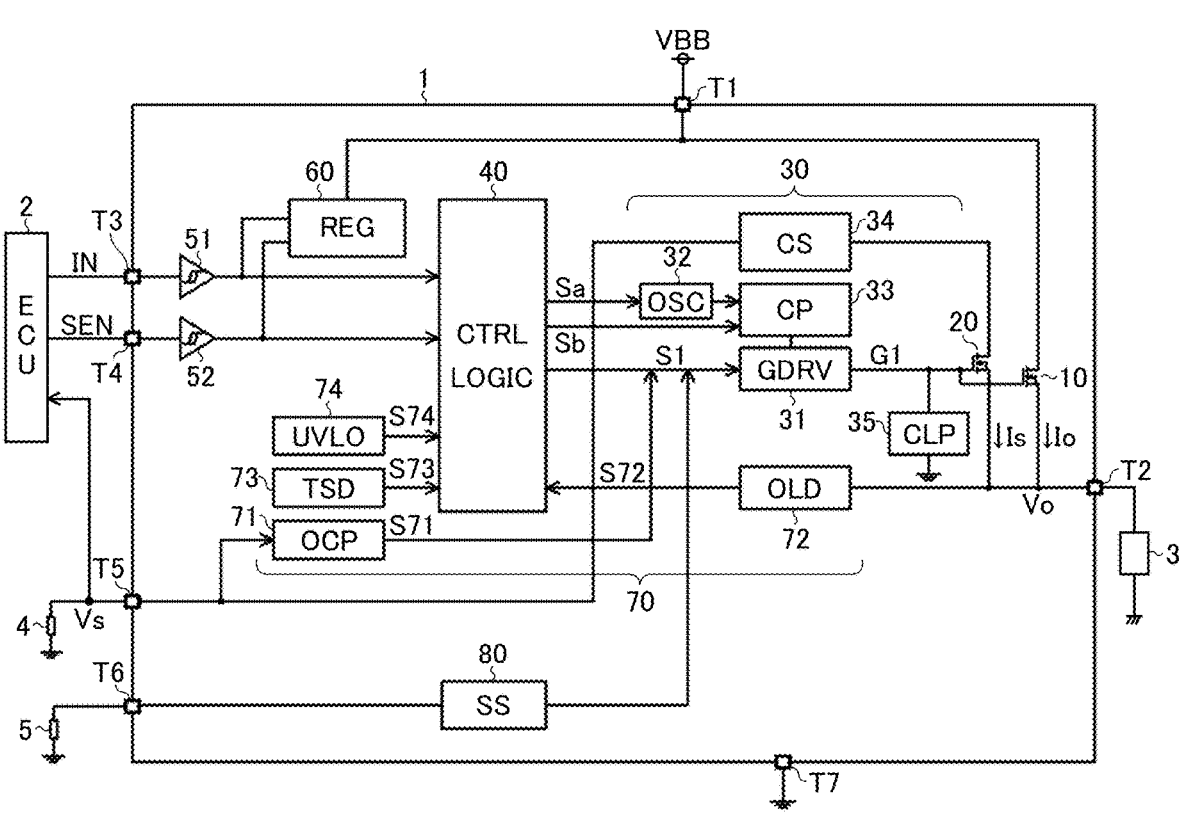
FIG. 1 is a diagram showing the overall configuration of a semiconductor integrated circuit device.

FIG. 1 is a diagram showing the overall configuration of a semiconductor integrated circuit device. The semiconductor integrated circuit device 1 of the present configuration example is an in-vehicle high side switch LSI (=one type of in-vehicle IPD) which conducts/interrupts between the application end of a power supply voltage VBB and a load 3 according to an instruction from an ECU [electronic control unit] 2 (which corresponds to a control device).

The semiconductor integrated circuit device 1 includes external terminals T1 to T7 as means for establishing electrical connection to the outside of the device. The external terminal T1 is a power supply terminal for receiving the supply of the power supply voltage VBB (for example, 12 V) from an unillustrated battery. The external terminal T2 is a load connection terminal or an output terminal for connecting the load 3 (such as a bulb lamp, a relay coil, a solenoid, a light emitting diode or a motor) to the outside.

Each of the external terminals T3 and T4 is a signal input terminal for receiving external inputs of an external control signal IN and an external enable signal SEN from the ECU 2. The external terminal T5 is a signal output terminal for externally outputting an output current detection signal Vs to the ECU 2. A resistor 4 is externally connected between the external terminal T5 and a ground end. The external terminal T6 is a soft start control terminal. A resistor 5 for adjusting a soft start time is externally connected between the external terminal T5 and the ground end. The external terminal T7 is a ground terminal.

With reference to the figure, the semiconductor integrated circuit device 1 integrates NMOSFETs [N-channel type metal oxide semiconductor field effect transistors] 10 and 20, a gate control unit 30, a control logic unit 40, signal input units 51 and 52, an internal power supply unit 60, an abnormality protection unit 70 and a soft start control unit 80.

The NMOSFET 10 is a high-voltage (for example, 42 V) power transistor in which the drain is connected to the external terminal T1 and the source is connected to the external terminal T2. The NMOSFET 10 connected as described above functions as a switch element (high side switch) for conducting/interrupting a current path extending from the application end of the power supply voltage VBB via the load 3 to the ground end. When a gate drive signal G1 is high, the NMOSFET 10 is on, and when the gate drive signal G1 is low, the NMOSFET 10 is off.

The NMOSFET 10 is preferably designed such that an on-resistance Ron is several tens of mΩ. However, as the on-resistance Ron of the NMOSFET 10 is decreased, an overcurrent is unlikely to flow when a ground fault occurs in the external terminal T2, with the result that abnormal heat generation easily occurs. The ground fault refers to a short circuit to the ground end or a low potential end equivalent thereto. Hence, as the on-resistance Ron of the NMOSFET 10 is decreased, the importance of an overcurrent protection circuit 71 and a temperature protection circuit 73 is increased.

The NMOSFET 20 is a current detection element (so-called mirror transistor) the gate of which is commonly connected to the gate of the NMOSFET 10. The NMOSFET 20 generates a sense current Is corresponding to an output current Io flowing through the NMOSFET 10. The size ratio of the NMOSFET 10 to the NMOSFET 20 is m:1 (where m>1). Hence, the sense current Is is 1/m of the output current Io. As with the NMOSFET 10, when the gate drive signal G1 is high, the NMOSFET 20 is on, and when the gate drive signal G1 is low, the NMOSFET 20 is off.

The gate control unit 30 generates the gate drive signal G1 obtained by increasing the current capability of a gate control signal S1, and outputs the gate drive signal G1 to the gates of the NMOSFETs 10 and 20 to control the turning on and off of the NMOSFETs 10 and 20.

With reference to the figure, the gate control unit 30 includes a gate driver 31, an oscillator 32, a charge pump 33, a current detection circuit 34 and an active clamp circuit 35.

The gate driver 31 is operated by receiving the supply of a step-up voltage VG from the charge pump 33 to generate the gate drive signal G1 obtained by increasing the current capability of the gate control signal S1. When the gate control signal S1 is high, the gate drive signal G1 is high (=VG), and when the gate control signal S1 is low, the gate drive signal G1 is low (=Vo).

The oscillator 32 generates a clock signal CLK of a predetermined frequency, and outputs the clock signal CLK to the charge pump 33. Whether the oscillator 32 is operated is controlled according to an internal enable signal Sa from the control logic unit 40.

The charge pump 33 is an example of a step-up unit which drives a flying capacity using the clock signal CLK to generate the step-up voltage VG higher than the power supply voltage VBB, and supplies the step-up voltage VG to the gate driver 31. Whether the charge pump 33 is operated is controlled according to an internal enable signal Sb from the control logic unit 40.

The current detection circuit 34 outputs the sense current Is (=Io/m) corresponding to the output current Io to the external terminal T5. Hence, the output current detection signal Vs (=Is×Rs) obtained by basically performing current/voltage conversion on the sense current Is with the resistor 4 (resistance value: Rs) is transmitted to the ECU 2. As the output current Io is increased, the output current detection signal Vs is increased, and as the output current Io is decreased, the output current detection signal Vs is decreased. When the current value of the output current Io is read from the output current detection signal Vs, the output current detection signal Vs is preferably subjected to A/D [analog-to-digital] conversion using the ECU 2.

The active clamp circuit 35 is connected between the gate of the NMOSFET 10 and the ground end. In an application in which an inductive load 3 is connected to the external terminal T2, when the NMOSFET 10 is switched from on to off, the output voltage Vo is a negative voltage (Vo<GND) due to the back electromotive force of the load 3. Hence, the active clamp circuit 35 is provided for energy absorption. The active clamp circuit 35 prevents the NMOSFET 10 from being fully turned off when the NMOSFET 10 transitions to an off state and thereby restricts the drain-source voltage (=VBB−Vo) of the NMOSFET 10 to an active clamp voltage Vclp or less. The active clamp voltage Vclp may be set with respect to a ground potential GND.

The control logic unit 40 receives inputs of the external control signal IN and the external enable signal SEN to generate the gate control signal S1 and the internal enable signals Sa and Sb. For example, when the external control signal IN is high (=a logic level when the NMOSFET 10 is turned on), the control logic unit 40 turns the gate control signal S1 high. On the other hand, when the external control signal IN is low (=a logic level when the NMOSFET 10 is turned off), the control logic unit 40 turns the gate control signal S1 low. The control logic unit 40 monitors various types of output signals of the abnormality protection unit 70.

The signal input units 51 and 52 are Schmitt triggers which respectively receive inputs of the external control signal IN and the external enable signal SEN from the external terminals T3 and T4, and transmit the external control signal IN and the external enable signal SEN to the control logic unit 40 and the internal power supply unit 60.

The internal power supply unit 60 generates a predetermined internal power supply voltage Vreg from the power supply voltage VBB and supplies the internal power supply voltage Vreg to the units of the semiconductor integrated circuit device 1. Whether the internal power supply unit 60 is operated is controlled according to the external control signal IN and the external enable signal SEN. For example, when both the external control signal IN and the external enable signal SEN are high, the internal power supply unit 60 is brought into an operating state, and when at least one of the external control signal IN and the external enable signal SEN is low, the internal power supply unit 60 is brought into a non-operating state.

The abnormality protection unit 70 is a circuit block which detects various types of abnormalities in the semiconductor integrated circuit device 1. With reference to the figure, the abnormality protection unit 70 includes an overcurrent protection circuit 71, an output abnormality detection circuit 72, a temperature protection circuit 73 and an undervoltage protection circuit 74.

The overcurrent protection circuit 71 generates an overcurrent protection signal S71 corresponding to the result of the monitoring of the output current detection signal Vs (=whether an overcurrent abnormality occurs in the output current Io). For example, the overcurrent protection signal S71 is turned low when no abnormality is detected, and the overcurrent protection signal S71 is turned high when an abnormality is detected. When the overcurrent protection signal S71 is high, the gate control signal S1 may be pulled down such that the output current Io is suppressed.

The output abnormality detection circuit 72 generates an output abnormality detection signal S72 corresponding to the result of the monitoring of the output voltage Vo (=whether an open load or a short-to-power occurs in the external terminal T2). The short-to-power refers to a short circuit to the application end of the power supply voltage VBB or a high potential end equivalent thereto. For example, the output abnormality detection signal S72 is turned low when no abnormality is detected, and the output abnormality detection signal S72 is turned high when an abnormality is detected.

The temperature protection circuit 73 includes a temperature detection element (not shown) which detects abnormal heat generation in the semiconductor integrated circuit device 1 (in particular, an area around the NMOSFET 10), and generates a temperature protection signal S73 corresponding to the result of the detection thereof (=whether abnormal heat generation occurs). For example, the temperature protection signal S73 is turned low when no abnormality is detected, and the temperature protection signal S73 is turned high when an abnormality is detected.

The undervoltage protection circuit 74 generates an undervoltage protection signal S74 corresponding to the result of the monitoring of the power supply voltage VBB or the internal power supply voltage Vreg (=whether an undervoltage abnormality occurs). For example, the undervoltage protection signal S74 is turned low when no abnormality is detected, and the undervoltage protection signal S74 is turned high when an abnormality is detected.

When the semiconductor integrated circuit device 1 is started up, the soft start control unit 80 gradually raises the gate control signal S1 over a predetermined soft start time Tss such that an excessive output current Io is prevented from flowing. The soft start time Tss may be configured to be arbitrarily adjustable using the resistor 5 externally connected to the external terminal T6.

<Considerations on Number of Terminals>

Incidentally, in order to perform appropriate overcurrent protection according to the load 3, the semiconductor integrated circuit device 1 has a gain adjustment function for the output current detection signal Vs using the resistor 4 (hence, an adjustment function for an overcurrent restriction value Vocp). When the present configuration is adopted, the external terminal T5 for externally attaching the resistor 4 to the semiconductor integrated circuit device 1 is needed.

In vehicle applications, it may be required to switch between abnormal modes (for example, a ground fault in output, a short-to-power and an open). Hence, some conventional semiconductor integrated circuit devices use one enable input terminal and two diagnostic output terminals to switch between abnormal modes.

However, if all of the above functions attempt to be incorporated into the semiconductor integrated circuit device 1 without any ingenuity, the number of terminals in the semiconductor integrated circuit device 1 is increased. Consequently, the product price of the semiconductor integrated circuit device 1 is increased.

In the following description, in view of the considerations described above, another embodiment is proposed in which the output abnormality state of the semiconductor integrated circuit device 1 can be determined while an increase in the number of terminals is being suppressed.

<Output Abnormality Detection Circuit>

Figure 2:
FIG. 2 is a diagram showing a configuration example of an output abnormality detection circuit.

FIG. 2 is a diagram showing a configuration example of the output abnormality detection circuit 72. The output abnormality detection circuit 72 of the present configuration example includes a current source 72A, resistors 72B and 72C, a comparator 72D, an enable control unit 72E and a signal output unit 72F.

The current source 72A is connected between the external terminal T1 (=power supply terminal to which the power supply voltage VBB is applied) and the external terminal T2 (=output terminal to which the output voltage Vo is applied), and generates a current IA which is supplied to the external terminal T2. The enabling and disabling of the current source 72A is switched according to an internal enable signal EN1. The current source 72A does not necessarily need to be a constant current source as shown in the figure. For example, a configuration may be adopted in which a resistor and a switch are connected in series between the external terminal T1 and the external terminal T2, and the switch is turned on and off according to the internal enable signal EN1.

The resistors 72B and 72C are connected in series between the external terminal T2 and the ground end. The resistors 72B and 72C connected as described above function as a voltage divider which outputs a monitoring voltage Vx (=divided voltage of the output voltage Vo) corresponding to the output voltage Vo from a connection node therebetween. If the output voltage Vo falls within the input dynamic range of the comparator 72D, the resistors 72B and 72C may be omitted, and the output voltage Vo may be directly input to the comparator 72D as the monitoring voltage Vx.

The comparator 72D compares the monitoring voltage Vx which is input to a non-inverting input terminal (+) and a predetermined threshold value Vy which is input to an inverting input terminal (−) to generate an output abnormality detection signal S72D, and outputs the output abnormality detection signal S72D to the signal output unit 72F. Hence, when Vx>Vy, the output abnormality detection signal S72D is high, and when Vx<Vy, the output abnormality detection signal S72D is low. The enabling and disabling of the comparator 72D is switched according to an internal enable signal EN2.

The enable control unit 72E generates the internal enable signals EN1 and EN2 according to the external control signal IN (which corresponds to the on/off control signal of the NMOSFET 10) and the external enable signal SEN input from the external terminals T3 and T4.

For example, when IN=L and SEN=L, the enable control unit 72E disables the current source 72A and enables the comparator 72D. When IN=L and SEN=H, the enable control unit 72E enables both the current source 72A and the comparator 72D. When IN=H, the enable control unit 72E disables both the current source 72A and the comparator 72D.

In other words, the enable control unit 72E generates the internal enable signals EN1 and EN2 so as to enable the comparator 72D during the off period (IN=L) of the NMOSFET 10 and to then switch the enabling and disabling of the current source 72A according to the external enable signal SEN.

The output abnormality detection circuit 72 configured as described above monitors, while switching between a first state (SEN=L) where no current is supplied to the external terminal T2 and a second state (SEN=H) where a current is supplied to the external terminal T2 during the off period (IN=L) of the NMOSFET 10, the output voltage Vo in each of the first and second states, and thereby generates the output abnormality detection signal S72D.

The signal output unit 72F is a circuit block configured to utilize the external terminal T5 (=signal output terminal which outputs the output current detection signal Vs corresponding to the output current Io) to output the result of the output abnormality detection of the external terminal T2.

With reference to the figure, the signal output unit 72F is configured to switch the logic level of the output current detection signal Vs according to the output abnormality detection signal S72D generated during the off period (IN=L) of the NMOSFET 10.

For example, the signal output unit 72F is operated such that during the off period (IN=L) of the NMOSFET 10, when the output abnormality detection signal S72D is low, the signal output unit 72F turns the output current detection signal Vs low, and when the output abnormality detection signal S72D is high, the signal output unit 72F turns the output current detection signal Vs high. In other words, the output current detection signal Vs is not an analog signal corresponding to the output current Io but a digital signal equivalent to the output abnormality detection signal S72D.

As described above, the output abnormality detection circuit 72 of the present configuration example monitors, while switching between the first state where no current is supplied to the external terminal T2 and the second state where a current is supplied to the external terminal T2 during the off period (IN=L) of the NMOSFET 10, the output voltage Vo of the external terminal T2 in each of the first and second states, and thereby switches the logic level of the output current detection signal Vs.

The overcurrent protection circuit 71 restricts the output current detection signal Vs to the predetermined overcurrent restriction value Vocp or less during the on period (IN=H) of the NMOSFET 10.

The temperature protection circuit 73 switches the logic level of the output current detection signal Vs according to whether abnormal heat generation occurs in the semiconductor integrated circuit device 1 (in particular, the NMOSFET 10). For example, when abnormal heat generation occurs in the semiconductor integrated circuit device 1, the temperature protection circuit 73 may raise the output current detection signal Vs to an abnormal heat generation detection value Vtsd higher than the overcurrent restriction value Vocp.

As described above, in the semiconductor integrated circuit device 1, the external terminal T5 which is provided as the output terminal for the output current detection signal Vs is also used as the output terminal for the result of the output abnormality detection. In the present configuration example, it is possible to determine the output abnormality state while suppressing an increase in the number of terminals. An output abnormality detection operation will be described in detail below.

FIG. 3 is a diagram showing an example of the output abnormality detection operation. In particular, in the figure, the output state (OUT) of the external terminal T2, the external control signal IN, the external enable signal SEN, the output current detection signal Vs and an abnormality determination result.

A case where the external terminal T2 is in a normal state (=state where an open load, a short-to-power and a ground fault do not occur) will first be described.

During the off period (IN=L) of the NMOSFET 10, the output current Io does not flow through the external terminal T2. The output voltage Vo is almost the ground potential GND. Hence, the output current detection signal Vs is low without depending on the logic level of the external enable signal SEN. Here, the ECU 2 which receives an input of the output current detection signal Vs determines that the NMOSFET 10 is in an off state.

On the other hand, during the on period (IN=H) of the NMOSFET 10, an appropriate output current Io flows from the external terminal T2 toward the load 3. Hence, the output current detection signal Vs is brought into a state where the output current detection signal Vs is output as an analog signal according to the output current Io (Vs=Is×Rs). When the output current Io is not in an overcurrent state, the output current detection signal Vs is changed in a range lower than the overcurrent restriction value Vocp. Here, the ECU 2 which receives an input of the output current detection signal Vs determines that the output current Io is in an output current detection state (=state where the output current Io normally flows without being restricted).

A case where the external terminal T2 is in an open load state (Open Load) will then be described.

During the off period (IN=L) of the NMOSFET 10, when SEN=L, the current source 72A is disabled. Hence, the external terminal T2 is brought into the first state where the current IA is not supplied to the external terminal T2. Here, when the external terminal T2 is in the open load state, the external terminal T2 is pulled down via the resistors 72B and 72C (or the resistance component Rx of an internal circuit connected to the source of the NMOSFET 10). Hence, the output voltage Vo is almost the ground potential GND. Consequently, Vx<Vy, and thus S72D=L (hence, Vs=L).

On the other hand, during the off period) (IN=L) of the NMOSFET 10, when SEN=H, the current source 72A is enabled. Hence, the external terminal T2 is brought into the second state where the current IA is supplied to the external terminal T2. Here, when the external terminal T2 is in the open load state, the output voltage Vo is a potential (Vo=IA× RA where RA is the combined resistance value of the resistors 72B and 72C) corresponding to the resistors 72B and 72C (or unillustrated resistance component accompanied between the external terminal T2 and the ground end). Therefore, the current IA and the combined resistance value RA are set appropriate, and thus Vx>Vy, with the result that S72D=H (hence, Vs=H).

As described above, in a case where the external terminal T2 is in the open load state, during the off period (IN=L) of the NMOSFET 10, in the first state (SEN=L), the output current detection signal Vs is low, and in the second state (SEN=H), the output current detection signal Vs is high.

Hence, when during the off period (IN=L) of the NMOS-FET 10, in the first state (SEN=L), the output current detection signal Vs is low, and in the second state (SEN=H), the output current detection signal Vs is high, the ECU 2 which receives an input of the output current detection signal Vs can determine that the external terminal T2 is in the open load state.

When the external terminal T2 is in the open load state, during the on period (IN=H) of the NMOSFET 10, only a minute output current Io (=VBB/(Ron+Rx) where Rx>Ron) flows through the NMOSFET 10. The output voltage Vo (=VBB−Ron×Io) is almost the power supply voltage VBB.

Consequently, the output current detection signal Vs is low without depending on the logic level of the external enable signal SEN. Such a state is no different from a case where the external terminal T2 is in a short-to-power state (details of which will be described later). Hence, even when the ECU 2 monitors the output current detection signal Vs during the on period (IN=H) of the NMOSFET 10, the ECU 2 cannot determine whether an abnormality which occurs in the external terminal T2 is an open load or a short-to-power.

A case where the external terminal T2 is in the short-to-power state will then be described.

During the off period (IN=L) of the NMOSFET 10, when SEN=L, the current source 72A is disabled. Hence, the external terminal T2 is brought into the first state where the current IA is not supplied to the external terminal T2. Here, when the external terminal T2 is in the short-to-power state, the output voltage Vo is almost the power supply voltage VBB. Hence, Vx>Vy, and thus S72D=H (therefore, Vs=H).

On the other hand, during the off period (IN=L) of the NMOSFET 10, when SEN=H, the current source 72A is enabled. Hence, the external terminal T2 is brought into the second state where the current IA is supplied to the external terminal T2. Here, when the external terminal T2 is in the short-to-power state, the output voltage Vo is almost the power supply voltage VBB. Therefore, Vx>Vy, and thus S72D=H (hence, Vs=H).

As described above, in a case where the external terminal T2 is in the short-to-power state, during the off period (IN=L) of the NMOSFET 10, even in the first state (SEN=L) or the second state (SEN=H), the output current detection signal Vs is high.

Hence, when during the off period (IN=L) of the NMOS-FET 10, both in the first state (SEN=L) and in the second state (SEN=H), the output current detection signal Vs is high, the ECU 2 which receives an input of the output current detection signal Vs can determine that the external terminal T2 is in the short-to-power state.

When the external terminal T2 is in the short-to-power state, a short circuit path which directly connects between the application end of the power supply voltage VBB and the load 3 is formed. The resistance component Ry of the short circuit path is extremely small (Ry=several to several tens of mΩ). Hence, during the on period (IN=H) of the NMOSFET 10, most of the current flowing from the application end of the power supply voltage VBB to the load 3 flows through the short circuit path described above as a short-to-power current Ivbbs, and thus almost no output current Io flows through the NMOSFET 10. The output voltage Vo (=VBB−Ry×Ivbbs) is almost the power supply voltage VBB.

Consequently, the output current detection signal Vs is low without depending on the logic level of the external enable signal SEN. Such a state is no different from a case where the external terminal T2 is in the open load state described above. Hence, even when the ECU 2 monitors the output current detection signal Vs during the on period (IN=H) of the NMOSFET 10, the ECU 2 cannot determine whether an abnormality which occurs in the external terminal T2 is an open load or a short-to-power.

A case where the external terminal T2 is in a ground fault state (GND Short) will then be described.

Even when the external terminal T2 is in the ground fault state, the output current Io does not flow through the external terminal T2 during the off state (IN=L) of the NMOSFET 10. The output voltage Vo is almost the ground potential GND. Hence, the output current detection signal Vs is low without depending on the logic level of the external enable signal SEN. Here, the ECU 2 which receives an input of the output current detection signal Vs determines that the NMOSFET 10 is in an off state. The determination operation described here is no different from a case where the external terminal T2 is in the normal state.

On the other hand, during the on period (IN=H) of the NMOSFET 10, an excessive output current Io flows through the NMOSFET 10 via the ground fault path of the external terminal T2. Here, the output current detection signal Vs is restricted to the overcurrent restriction value Vocp or less by the action of the overcurrent protection circuit 71.

Hence, when the output current detection signal Vs is maintained at the overcurrent restriction value during the on period (IN=H) of the NMOSFET 10, the ECU 2 which receives an input of the output current detection signal Vs can determine that the external terminal T2 is in the ground fault state or an overcurrent restriction state.

Figure 4:
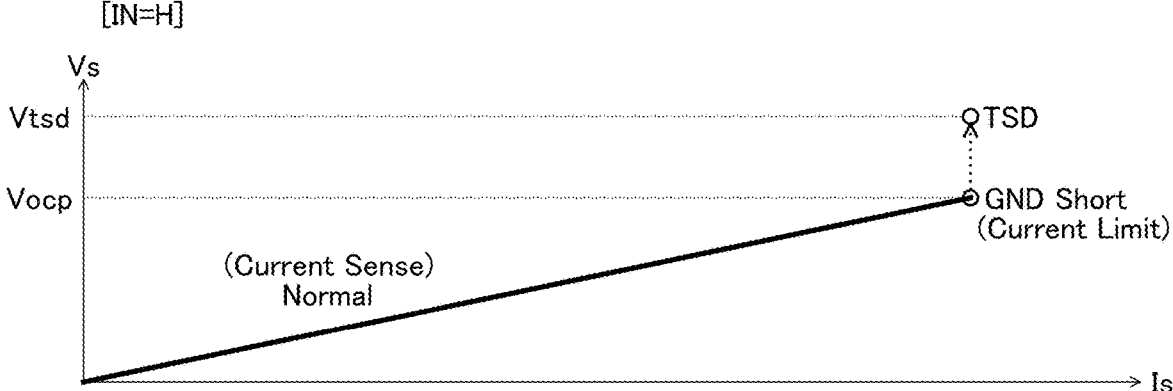
FIG. 4 is a diagram showing an example of an output current detection signal when IN=H.

FIG. 4 is a diagram showing an example of the output current detection signal Vs during the on period (IN=H) of the NMOSFET 10. The vertical axis in the figure represents the output current detection signal Vs. The horizontal axis in the figure represents the sense current Is.

The ECU 2 determines that the external terminal T2 is in the output current detection state (that is, the normal state) when the output current detection signal Vs is output as an analog signal in a voltage range lower than the overcurrent restriction value Vocp without being fixed to a low level during the on period (IN=H) of the NMOSFET 10.

The ECU 2 determines that the external terminal T2 is in the ground fault state or the overcurrent restriction state when the output current detection signal Vs is maintained at the overcurrent restriction value Vocp during the on period (IN=H) of the NMOSFET 10.

The ECU 2 determines that the external terminal T2 is in an abnormal heat generation state (TSD) when the output current detection signal Vs is raised to the abnormal heat generation detection value Vtsd higher than the overcurrent restriction value Vocp by the action of the temperature protection circuit 73 during the on period (IN=H) of the NMOSFET 10.

Figure 5:
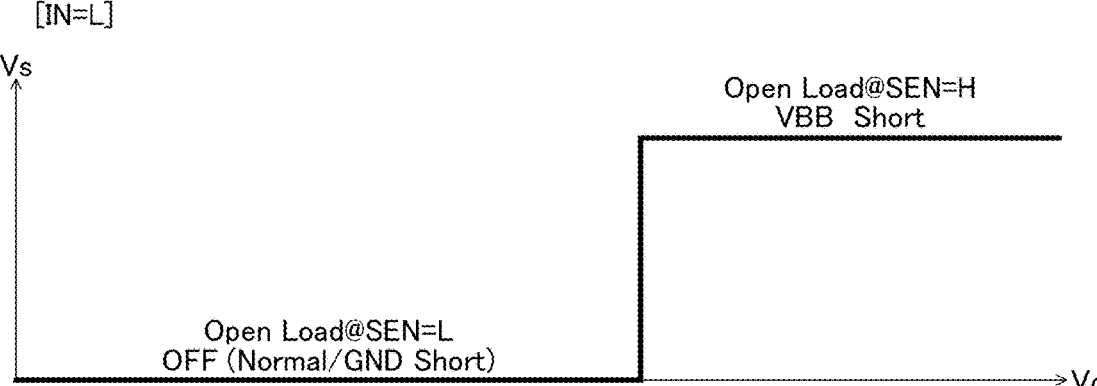
FIG. 5 is a diagram showing an example of the output current detection signal when IN=L.

FIG. 5 is a diagram showing an example of the output current detection signal Vs during the off period (IN=L) of the NMOSFET 10. The vertical axis in the figure represents the output current detection signal Vs. The horizontal axis in the figure represents the output voltage Vo.

The ECU 2 determines that the NMOSFET 10 is in an off state (regardless of whether the external terminal T2 is in the normal state or in the ground fault state) when the output current detection signal Vs is low regardless of whether the external enable signal SEN is high or low during the off period (IN=L) of the NMOSFET 10.

The ECU 2 determines that the external terminal T2 is in the open load state when the external enable signal SEN is low and thus the output current detection signal Vs is low, and the external enable signal SEN is high and thus the output current detection signal Vs is high during the off period (IN=L) of the NMOSFET 10.

The ECU 2 can determine that the external terminal T2 is in the short-to-power state when the output current detection signal Vs is high regardless of whether the external enable signal SEN is high or low during the off period (IN=L) of the NMOSFET 10.

<Application to Vehicle>

Figure 6:
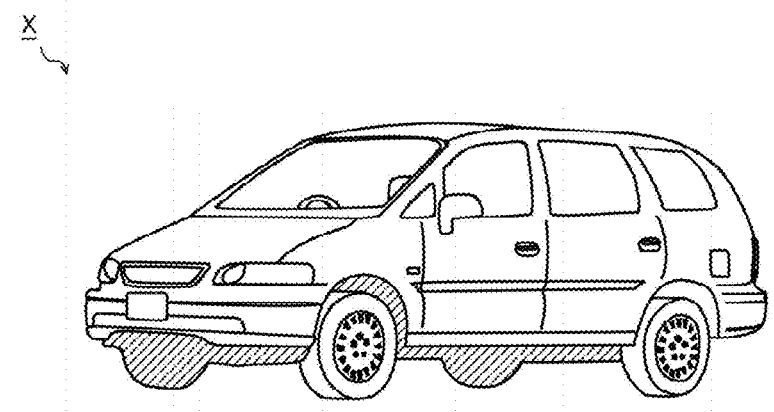
FIG. 6 is a diagram showing the appearance of a vehicle.

FIG. 6 is a diagram showing the appearance of a vehicle. The vehicle X of the present configuration example installs various electronic devices which are operated by receiving power supply from a battery.

Examples of the vehicle X include not only engine vehicles but also electric vehicles (xEVs such as a BEV [battery electric vehicle], a HEV [hybrid electric vehicle], a PHEV/PHV [plug-in hybrid electric vehicle/plug-in hybrid vehicle] and an FCEV/FCV [fuel cell electric vehicle/fuel cell vehicle]).

The semiconductor integrated circuit device 1 which has been previously described can be incorporated in any of the electronic devices installed in the vehicle X.

<Summary>

According to the present disclosure, it is possible to provide a switch device capable of determining an abnormal output state while suppressing an increase in the number of terminals, as well as an electronic device and a vehicle using the same. The following description is a summary of the various embodiments described above.

For example, a switch device disclosed in the present specification: a power supply terminal configured to receive supply of a power supply voltage; an output terminal configured to connect a load to the outside; a switch element configured to be connected between the power supply terminal and the output terminal; a signal output terminal configured to output an output current detection signal corresponding to an output current that flows during the on period of the switch element; an overcurrent protection circuit configured to restrict the output current detection signal to a predetermined overcurrent restriction value or less during the on period of the switch element; and an output abnormality detection circuit configured to monitor, while switching between a first state where no current is supplied to the output terminal and a second state where a current is supplied to the output terminal during the off period of the switch element, an output voltage of the output terminal in each of the first and second states, and to switch the logic level of the output current detection signal (first configuration)

In the switch device of the first configuration described above, the output abnormality detection circuit may include: a current source configured to generate the current supplied to the output terminal; a comparator configured to compare a monitoring voltage corresponding to the output voltage and a predetermined threshold voltage to generate an output abnormality detection signal; an enable control unit configured to enable the comparator during the off period of the switch element and to then switch enabling and disabling of the current source; and a signal output unit configured to switch the logic level of the output current detection signal according to the output abnormality detection signal (second configuration).

In the switch device of the second configuration described above, the output abnormality detection circuit may further include: a voltage divider configured to divide the output voltage to generate the monitoring voltage (third configuration).

The switch device of any one of the first to third configurations described above may further include: a temperature protection circuit configured to switch the logic level of the output current detection signal according to whether abnormal heat generation occurs (fourth configuration).

The switch device of any one of the first to fourth configurations described above may further include: a first signal input terminal configured to receive an input of an external control signal for switching turning on and off of the switch element; and a second signal input terminal config- ured to receive an input of an external enable signal for switching between the first state and the second state (fifth configuration).

For example, an electronic device disclosed in the present specification includes: the switch device of any one of the first to fifth configurations described above; and a control device configured to receive an input of the output current detection signal (sixth configuration).

In the electronic device of the sixth configuration described above, the control device may determine that the output terminal is in a short-to-power state when the output current detection signal is at a first logic level both in the first state and in the second state during the off period of the switch element, and that the output terminal is in an open load state when the output current detection signal is at a second logic level in the first state and is at the first logic level in the second state (seventh configuration).

In the electronic device of the seventh configuration described above, the control device may determine that the output terminal is in an output current detection state when the output current detection signal is lower than the over- current restriction value during the on period of the switch element, and that the output terminal is in a ground fault state or an overcurrent restriction state when the output current detection signal is maintained at the overcurrent restriction value (eighth configuration).

In the electronic device of the seventh configuration described above, the switch device may further include a temperature protection circuit configured to raise the output current detection signal above the overcurrent restriction value when abnormal heat generation occurs, and the control device may determine that the output terminal is in an abnormality heat generation state when the output current detection signal is raised above the overcurrent restriction value during the on period of the switch element (ninth configuration).

For example, a vehicle disclosed in the present specifi- cation includes the electronic device of any one of the sixth to ninth configurations described above (tenth configura- tion).

<Other Variations>

Although in the embodiment described above, the in- vehicle high side switch LSI is used as the example, the target to which the invention disclosed in the present speci- fication is applied is not limited to this example and can be widely applied to high side switch LSIs for applications other than the in-vehicle application.

In addition to the embodiment described above, various changes can be made to the various technical features disclosed in the present specification without departing from the spirit of the technical creation thereof. In other words, the embodiment described above should be considered to be illustrative and not restrictive in all respects. The technical scope of the present invention is indicated not by the description of the above embodiment but by the scope of claims, and meanings equivalent to the scope of claims and all changes in the scope should be understood to be included therein.

The invention claimed is:

1. A switch device comprising:
a power supply terminal configured to receive supply of a power supply voltage;
an output terminal configured to connect a load to an outside;
a switch element configured to be connected between the power supply terminal and the output terminal;
a signal output terminal configured to output an output current detection signal corresponding to an output current that flows during an on period of the switch element;
an overcurrent protection circuit configured to restrict the output current detection signal to a predetermined overcurrent restriction value or less during the on period of the switch element; and
an output abnormality detection circuit configured to monitor, while switching between a first state where no current is supplied to the output terminal and a second state where a current is supplied to the output terminal during an off period of the switch element, an output voltage of the output terminal in each of the first and second states, and to switch a logic level of the output current detection signal.

2. The switch device according to claim 1,
wherein the output abnormality detection circuit includes:
a current source configured to generate the current supplied to the output terminal;
a comparator configured to compare a monitoring volt- age corresponding to the output voltage and a pre- determined threshold voltage to generate an output abnormality detection signal;
an enable control unit configured to enable the com- parator during the off period of the switch element and to then switch enabling and disabling of the current source; and
a signal output unit configured to switch the logic level of the output current detection signal according to the output abnormality detection signal.

3. The switch device according to claim 2,
wherein the output abnormality detection circuit further includes: a voltage divider configured to divide the output voltage to generate the monitoring voltage.

4. The switch device according to claim 1, further com- prising:
a temperature protection circuit configured to switch the logic level of the output current detection signal according to whether abnormal heat generation occurs.

5. The switch device according to claim 1, further com- prising:
a first signal input terminal configured to receive an input of an external control signal for switching turning on and off of the switch element; and
a second signal input terminal configured to receive an input of an external enable signal for switching between the first state and the second state.

6. An electronic device comprising:
the switch device according to claim 1; and
a control device configured to receive an input of the output current detection signal.

7. The electronic device according to claim 6,
wherein the control device determines
that the output terminal is in a short-to-power state when the output current detection signal is at a first logic level both in the first state and in the second state during the off period of the switch element, and
that the output terminal is in an open load state when the output current detection signal is at a second logic level in the first state and is at the first logic level in the second state.

8. The electronic device according to claim 7,
wherein the control device determines
  that the output terminal is in an output current detection
    state when the output current detection signal is
    lower than the overcurrent restriction value during
    the on period of the switch element, and
  that the output terminal is in a ground fault state or an
    overcurrent restriction state when the output current
    detection signal is maintained at the overcurrent
    restriction value.

9. The electronic device according to claim 8,
wherein the switch device further includes a temperature
  protection circuit configured to raise the output current
  detection signal above the overcurrent restriction value
  when abnormal heat generation occurs, and
the control device determines that the output terminal is in
  an abnormality heat generation state when the output
  current detection signal is raised above the overcurrent
  restriction value during the on period of the switch
  element.

10. A vehicle comprising:
the electronic device according to claim 6.

\*   \*   \*   \*   \*